US008487945B2

(12) United States Patent
Courtney, Jr. et al.

(10) Patent No.: US 8,487,945 B2
(45) Date of Patent: Jul. 16, 2013

(54) METHODS FOR SETTING A PIXEL CLOCK FREQUENCY

(75) Inventors: Gerald P. Courtney, Jr., Austin, TX (US); Yi Zhang, Austin, TX (US); Indu Ramamurthi, Austin, TX (US); Leo Joseph Gerten, Taipei (TW)

(73) Assignee: Dell Products L.P., Round Rock, TX (US)

( * ) Notice: Subject to any disclaimer, the term of this patent is extended or adjusted under 35 U.S.C. 154(b) by 934 days.

(21) Appl. No.: 12/209,167

(22) Filed: Sep. 11, 2008

(65) Prior Publication Data

US 2010/0060653 A1 Mar. 11, 2010

(51) Int. Cl.
*G06T 1/60* (2006.01)

(52) U.S. Cl.
USPC .......................................................... 345/530

(58) Field of Classification Search
USPC .............. 345/530, 204, 100; 455/61; 235/492
See application file for complete search history.

(56) References Cited

U.S. PATENT DOCUMENTS

| | | | | |
|---|---|---|---|---|
| 5,926,166 | A * | 7/1999 | Khederzadeh et al. | 345/581 |
| 6,826,247 | B1 * | 11/2004 | Elliott et al. | 375/376 |
| 7,136,042 | B2 | 11/2006 | Magendanz et al. | |
| 7,193,621 | B2 | 3/2007 | Wang | |
| 7,434,738 | B2 * | 10/2008 | Cromer et al. | 235/492 |
| 7,894,773 | B2 * | 2/2011 | Slattery et al. | 455/63.1 |
| 2001/0004257 | A1 * | 6/2001 | Nitta et al. | 345/211 |
| 2006/0221881 | A1 * | 10/2006 | Morisawa | 370/311 |
| 2007/0130434 | A1 * | 6/2007 | Chu et al. | 711/163 |
| 2008/0143694 | A1 * | 6/2008 | Tu et al. | 345/204 |

OTHER PUBLICATIONS

VESA Ehanced Extended Display Identification Data Standard (Feb. 9, 2000).*

* cited by examiner

*Primary Examiner* — Ke Xiao
*Assistant Examiner* — Kyle Zhai
(74) *Attorney, Agent, or Firm* — Baker Botts L.L.P.

(57) ABSTRACT

A method of setting a pixel clock frequency for a display of an information handling system (IHS) is disclosed whereby the method includes detecting an identifier associated with a wireless card operable for use with the IHS. The method also includes selecting a timing descriptor, the timing descriptor associated with a display setting and wherein the timing descriptor corresponds to the identifier. The method further includes setting the pixel clock frequency based on the timing descriptor selected.

20 Claims, 4 Drawing Sheets

400

| 410 | 420 | 430 |
|---|---|---|
| US EDID | TIMING DESC#1 | 850, 1900 BANDS |
| EU EDID | TIMING DESC#2 | 850, 1800, 2100 BANDS |

METHODS FOR SETTING A PIXEL CLOCK FREQUENCY

BACKGROUND

1. Technical Field

The present disclosure relates generally to information handling systems and, more specifically, to setting pixel clock frequencies for displays within information handling systems.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Graphics and/or text may be displayed on one or multiple panels or displays coupled to an in information handling system (IHS). Examples of such displays may include a cathode ray tube (CRT), liquid crystal display (LCD) or plasma screen or any suitable display or panel type. Characteristics of the graphics and/or text constitute image data which may be generated by pixel clock signals. Within a typical LCD panel, for example, a pixel clock signal source is configured to provide a pixel clock signal of relatively low frequency with higher frequency harmonics in the form of carrier bands.

Typically, panel pixel clock harmonics may produce some degree of noise and in some instances, the level of noise may occur in the range of approximately 20-30 decibels (dB). In addition to pixel clock harmonics, an IHS may also be configured for wireless (e.g., wireless wide are network (WWAN)) connectivity and thus, may generate wireless signals of particular frequencies. The frequency of wireless carrier bands may depend on regions of operation, such as, for example, the United States (US), Europe (EU) and Japan (JP), with each region occupying specific frequencies which differ from one another. In systems generating wireless signals, the wireless carrier bands may interfere with the panel pixel clock frequencies and harmonics, thus adversely affecting wireless network connectivity or operability of a display. For example, an IHS receiving a wireless network signal having a carrier band with a frequency in the 1900 MHz range may experience a connectivity problem for the user if the system's pixel clock harmonic lands within the same wireless frequency band.

Current technology may reduce the panel's pixel clock harmonic slightly, for example, from approximately 20 dB to 15 dB in some cases. However, the occurrence of noise interference has not yet been eliminated and technology utilized to reduce the panel pixel clock harmonic may have adverse effects on the wireless connection. Further, some lower resolution panels may be unable to support high pixel clock frequencies which may be required to avoid failing into the wireless carrier bands. Thus, a need exists for improved methods of setting a pixel clock at particular frequencies to avoid interference with wireless carrier bands.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure is a method of setting a pixel clock frequency for a display of an information handling system (IHS) which includes detecting an identifier associated with a wireless card operable for use with the IHS. The method also includes selecting a timing descriptor, the timing descriptor associated with a display setting and wherein the timing descriptor corresponds to the identifier. The method further includes setting the pixel clock frequency based on the timing descriptor selected.

Another aspect of the present disclosure is an information handling system (IHS) providing a wireless card coupled to the IHS and a basic input/output system (BIOS), wherein the BIOS is configured to detect an identifier associated with the wireless card. The system further includes a video basic input/output system (VBIOS) within a graphics card configured to operate a display coupled to the IHS, the VBIOS configured to select a timing descriptor corresponding to the identifier and wherein a pixel clock frequency is set based on the timing descriptor.

Yet another aspect of the present disclosure is a computer-readable medium having computer executable instructions for carrying out a method whereby the method includes detecting an identifier associated with a wireless card operable for use with the IHS. The method further includes selecting a timing descriptor, wherein the timing descriptor corresponds to the identifier and setting the pixel clock frequency based on the timing descriptor selected.

BRIEF DESCRIPTION OF THE DRAWINGS

For simplicity and clarity of illustration, the drawing and/or figures illustrate the general manner of an information handling system and components thereof. Descriptions and details of well known features and techniques may be omitted to avoid unnecessarily obscuring the disclosure.

For detailed understanding of the present disclosure, references should be made to the following detailed description of the several aspects, taken in conjunction with the accompanying drawings, in which like elements have been given like numerals and wherein.

DETAILED DESCRIPTION

Before the present methods and systems are described, it is to be understood that this disclosure is not limited to the particular methods and systems described, as such may vary. One of ordinary skill in the art should understand that the terminology used herein is for the purpose of describing possible aspects, embodiments and/or implementations only, and is not intended to limit the scope of the present disclosure which will be limited only by the appended claims. For example, to one of ordinary skill in the art, it will be readily apparent that the method of setting a pixel clock frequency as discussed herein may be implemented in a variety of ways, and that the discussion of these implementations does not necessarily represent a complete description of all possible implementations.

It must also be noted that as used herein and in the appended claims, the singular forms "a," "and," and "the" may include plural referents unless the context clearly dictates otherwise. Thus, for example, reference to "a panel" may refer to one or multiple panels and reference to "a method of setting" includes reference to equivalent steps and methods known to those skilled in the art, and so forth.

Figure 1:
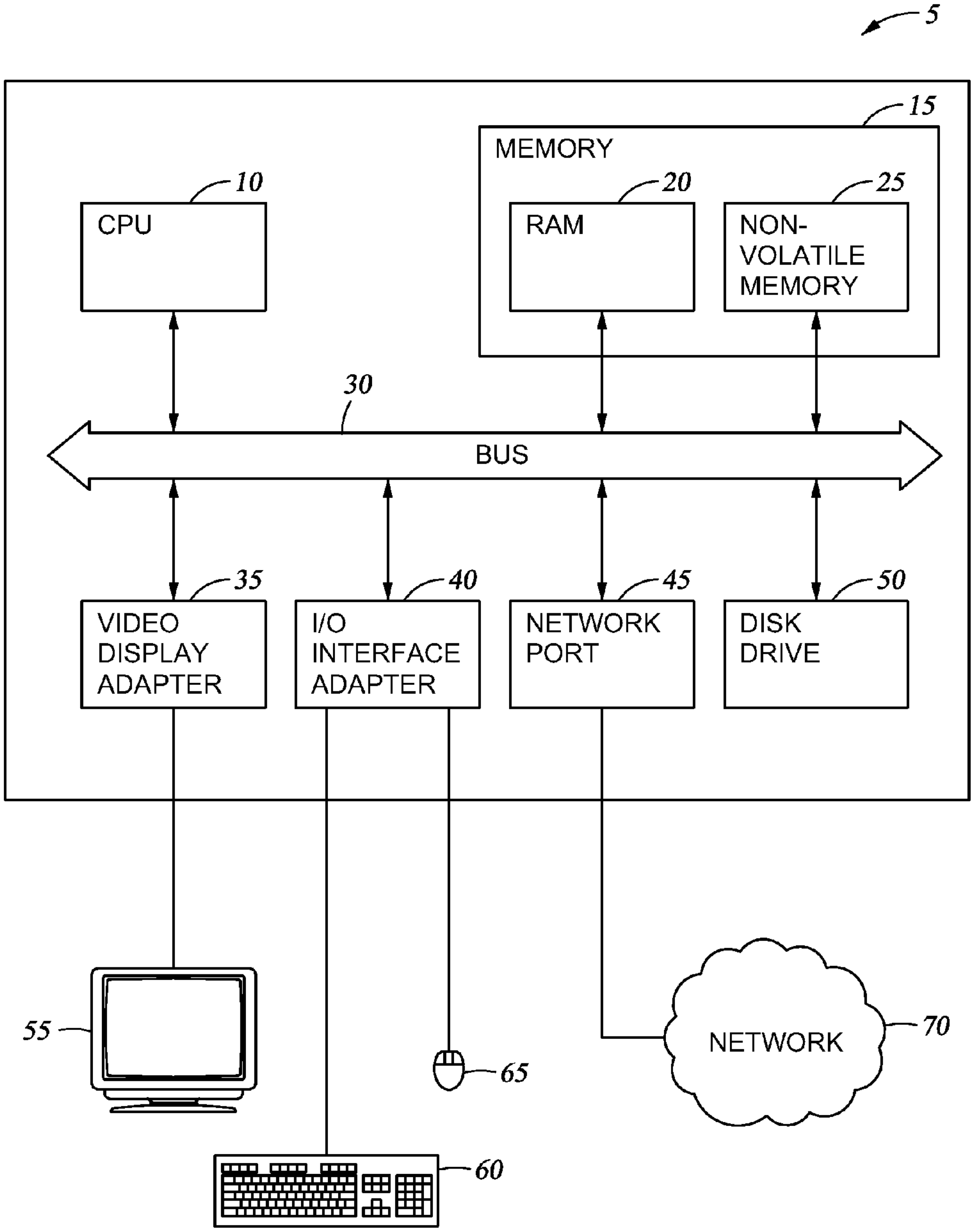
FIG. 1 is a block diagram of an information handling system according to one aspect of the disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, a mouse 65, a panel or display 55 and/or other input/output devices not shown here. This type of firmware may be known as a basic input/output system (BIOS). The BIOS identifies and initializes system component hardware (e.g., hard disk drive (HDD), graphics card, wireless card) upon system power on. The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. Further, the IHS 5 may be coupled to a card (not shown) to enable the system to connect to a wireless network (e.g., wireless wide area network (WWAN)). As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
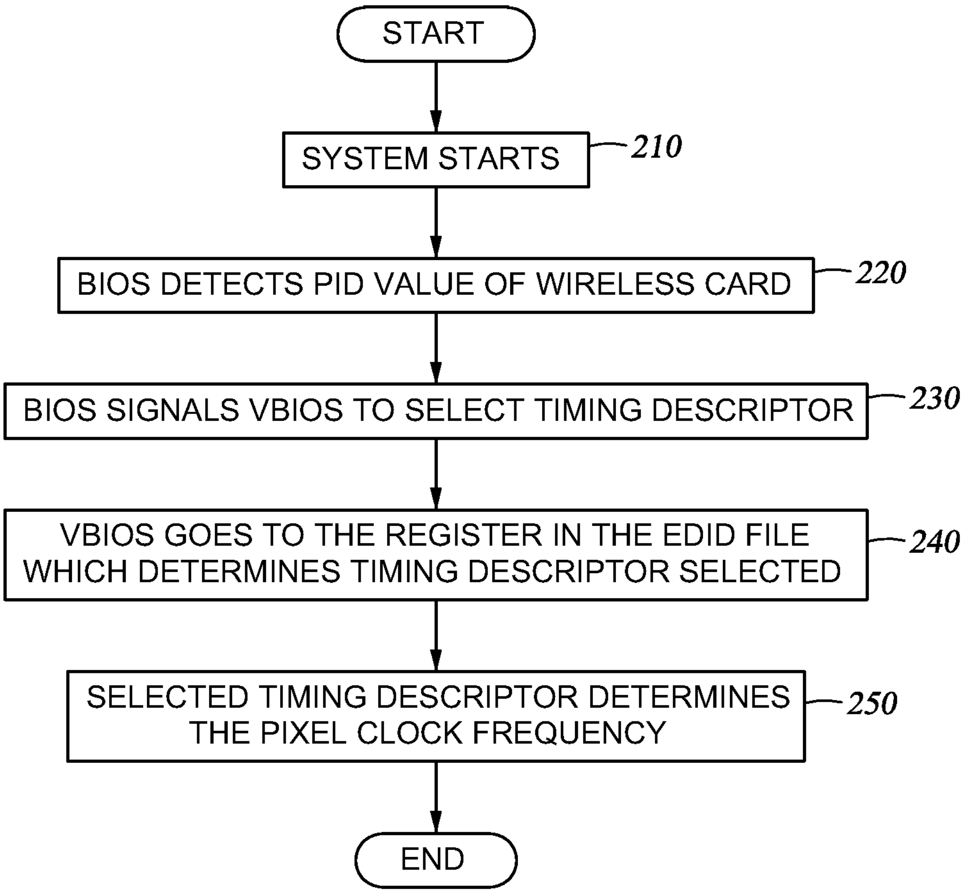
FIG. 2 is a flow diagram of an illustrative method for setting a pixel clock frequency according to another aspect of the disclosure.

As previously stated, a source within the IHS panel, such as an LCD, may generate a pixel clock signal of a particular frequency whereby the pixel clock provides the characteristics of the graphics and/or text displayed on the panel. As used herein, the terms "panel", "display" and "monitor" may be used interchangeably to refer to any output device coupled to the IHS for the presentation of information. Referring now to FIG. 2, a flow diagram is provided of an illustrative method for setting a pixel clock frequency in accordance with one aspect of the present disclosure. An IHS, configured for wireless connectivity (e.g., via WWAN, Wi-Fi) is powered on or rebooted in step 210. Next, in step 220, the system basic input/output system (BIOS) detects the system's wireless signals via an identifier such as the pixel identification (PID) value of a wireless component (e.g., wireless card) coupled to the IHS. The PID value may be any value (e.g., frequency) for the purpose of identification, for example, stored in the wireless component (e.g., WWAN card) which is indicative of geographic region (e.g., United States (US), Europe (EU), Japan) from which a user operates the IHS. Although the present disclosure references specific geographical regions such as the US, Europe and Japan, it is understood that the methods and systems disclosed herein have applicability to any suitable geographic region.

Referring back to FIG. 2, in step 230 the BIOS instructs or signals the video BIOS (VBIOS) within a video or graphics card of the IHS to select a timing descriptor stored in a register of an Extended Display Identification Data (EDID) file. As is known, EDID is a Video Electronics Standards Association ("VESA") standard data format that contains basic information about a monitor and its display capabilities, including pixel clock frequency, refresh rate, vendor information, maximum image size, color characteristics, serial number, character strings, panel resolution and the like. Typically, information in the EDID file is stored in the display and is provided to an IHS via a display controller when the monitor is coupled to the IHS. An IHS may use the EDID information for video configuration purposes to enhance the operation of the monitor and system. During the IHS pre-boot or power-on self test (POST), VBIOS calls the system BIOS through an interface (e.g., INT15) for detailed system configuration information. The configuration information may be constructed in the form of a table in which one of the entries is to hold a flag as the LCD timing descriptor (described below) selector. System BIOS is able to read the LCD Panel EDID table prior to the VBIOS call, and fill in the entry held as a flag based on the Panel EDID table.

Figure 3:
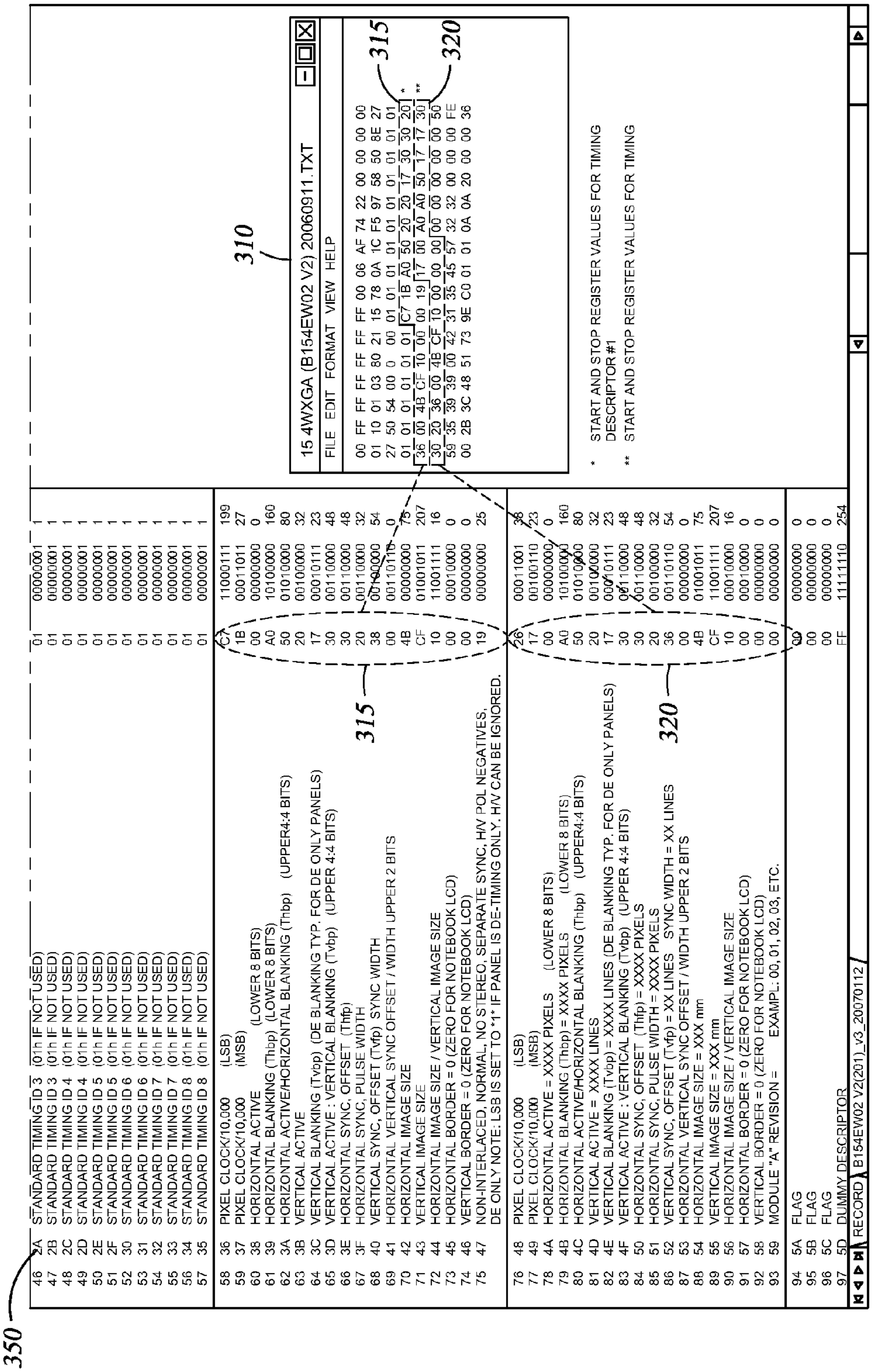
FIG. 3 is a illustrative implementation of an extended display identification data (EDID) file according to yet another aspect of the disclosure.

Referring now to FIG. 3, a block diagram is provided of an EDID 300 according to one aspect of the disclosure. As shown, the EDID 300 and text file 310 include a combination of values from register 36 to register 47, indicated generally at 315, which determine the pixel clock frequency stored in a default timing descriptor (e.g., Timing Descriptor #1). The EDID 300 and text file 310 also include a combination of values from register 48 to register 59, indicated generally at 320, which determine the pixel clock frequency stored in a secondary timing descriptor (e.g., Timing Descriptor #2). Data in an EDID may be stored as timing descriptors or detailed timing descriptors (DTD) in several formats including abbreviated, bit (i.e., binary) format or byte (i.e., hexadecimal) format. Timing descriptors may characterize display settings such as a horizontal scanning frequency, a vertical refresh rate, resolution, gray levels for pixels and the like. Also, the pixel clock frequency may be defined by the timing descriptors. For example, in of the case of a panel with timing descriptors which characterize the resolution (e.g., 1280×800), horizontal blanking (e.g., 128) and vertical blanking (e.g., 128), the typical clock frequency may be 68.9 MHz. As shown, the EDID 300 may include register locations 350 for Timing Descriptor #1 315 and Timing Descriptor #2 320. The types of data shown in the table are not intended to limit the scope of this disclosure, but rather are intended to provide values which may be found generally in an EDID, for the purpose of explanation only. Therefore, a person of skill in the art would understand that the values in an EDID may be modified, such as to include additional data or to exclude data shown, and it is intended that these modifications be within the scope this disclosure.

Referring back to FIG. 2, once a timing descriptor is selected, step 240 occurs as the VBIOS reads the content of the EDID which determines the timing selector selected. The instruction of the VBIOS to load Timing Descriptor #1 or Timing Descriptor #2 is based on the PID value of the wireless card. In one implementation, a PID value may indicate that a wireless card is configured for a US region with a default timing description (e.g, Timing Descriptor #1) and thus, Timing Descriptor #2 may be selected. Finally, in step 250, the panel pixel clock is set at a frequency associated with the timing descriptor selected. In the case where Timing Descriptor #2 is selected as mentioned previously, the pixel clock frequency is shifted to non-US bands (to be described below) such as 900, 1800 or 2100 (e.g., European bands). Thus, a user operating an IHS in the US with WWAN connectivity would not experience pixel problems (e.g., decreased pixel resolution) as a result of interference between the WWAN signals and pixel clock. Alternatively, a user in Europe would not experience pixel problems in the 900, 1800 and 2100 bands as the Timing Descriptor #1, as described herein, is selected. In one possible implementation, Timing Descriptor #1 may characterize the United States (US) Bands (i.e., 850 and 1900 bands) while Timing Descriptor #2 would apply to the European (EU) Bands (i.e., 900, 1800 and 2100 bands), as will be discussed below.

Figures 4, 5:
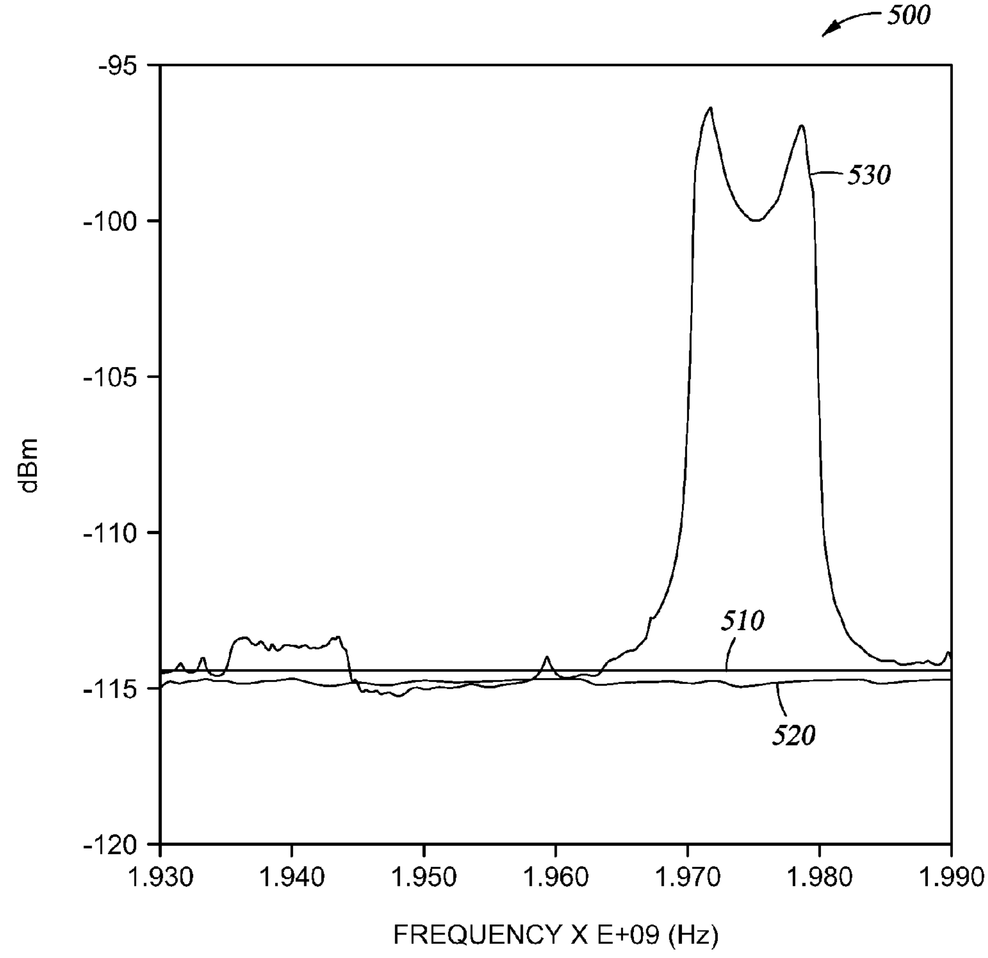
FIG. 4 is a table indicating display frequencies according to a further aspect of the disclosure.
FIG. 5 is a graph of pixel clock harmonics according to a further aspect of the disclosure.

Turning now to FIG. 4, a table 400 is shown providing data corresponding to pixel clock frequency spectra in the United States (US) and Europe (EU), for example. The table 400 shows values in a first column as EDID file type categorized by geographic region 410 such as the United States (US), Europe (EU), Japan (not shown), further labeled in a second column as timing descriptor type 420 (e.g., Timing Descriptor #1, Timing Descriptor #2). The table 400 associates the geographic regions 410 and timing descriptor types 420 with panel pixel clock frequency bands 430. In one implementation, an EDID file for an IHS operating within the US, labeled Timing Descriptor #1 may comprise timing descriptors associated with the 850 and 1900 panel pixel clock frequency bands. In another implementation, an EDID file for an IHS operating within Europe, labeled Timing Descriptor #2 may comprise timing descriptors associated with the 900 and 1850 and 2100 panel pixel clock frequency bands. The pixel clock frequency bands 430 as shown are a combination of the frequency bands that may be supported by a particular WWAN card.

Referring now to FIG. 5, a graph 500 is provided depicting pixel clock harmonics according to a further aspect of the disclosure. The graph 500, indicating electrical power in dBm (1 mW) by frequency in hertz (Hz), depicts a pixel clock harmonic 530 in the carrier band at approximately 1900 MHz. Alternatively, a shifted pixel clock harmonic, indicated at 520, experiencing a shift out of the carrier band may closely resemble a specification at 510. By way of example only, the pixel clock harmonic 530 at 1900 MHz based on a primary timing descriptor (e.g., Timing Descriptor #1) may be characteristic of a typical IHS operating in the US region. The same IHS operating in the US region may have a modified pixel clock harmonic 520 based on a secondary timing descriptor (e.g., Timing Descriptor #2) characteristic of a non-US EDID (i.e., European or EU EDID). The modified pixel clock harmonic 520 is shown shifted out of the 1900 band, and thus not interfering with the pixel clock harmonic 530 at 1900 MHz. The present disclosure, which is applicable for wireless operation, may be implemented in multiple countries and/or geographic regions.

According to the present disclosure, within an EDID of an IHS panel, a timing descriptor may be configured and/or switched based on a wireless card to operate at different pixel clock frequencies, particularly at a frequency which does not interfere with the system's wireless signal. Thus, when a user operates the IHS in a particular geographic region, pixel clock frequency may be shifted to a frequency characteristic of a different geographic region so that the user's wireless connectivity is not affected by the pixel clock frequency. Methods proposed herein for shifting the pixel clock frequency may eliminate harmonic noise affecting wireless connectivity for IHSs, particularly in the case of WWAN operations. Further, the shifting of the pixel clock frequency proposed herein may enable multiple carrier technologies with multiple display panels on a particular IHS. It is further contemplated that the disclosure relates to manipulating multiple pixel clocks through the same EDID within an IHS.

Methods of the present disclosure may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that the above-mentioned media may take various forms such as cards, tapes, magnetic disks (e.g., floppy disk or hard drive), optical disks (e.g., compact disk read only memory ("CD-ROM") or digital versatile disc ("DVD")) or any other medium/media which can be used to store desired information and which can accessed by an IHS. It should be understood that the given implementations are illustrative only and shall not limit the present disclosure.

Particular embodiments and/or implementations of the present disclosure have been described in detail. However, the present disclosure is not limited to these embodiments and/or implementations, and it is understood by one skilled in the art that various other embodiments and/or implementations are possible within the scope of the present disclosure. It is understood that the present disclosure may be applicable to different types of displays, including but not limited to liquid crystal displays (LCDs), cathode ray tube (CRT's), plasma screen, any device that is capable of displaying graphics and/or text and any combination thereof. The present disclosure further contemplates EDID of various types characterized by geographic region such as the United States (US), Europe (EU), Japan or any suitable region.

Methods of the present disclosure may be presented in terms of logic, software or software implemented aspects typically encoded on a variety of media or medium including, but not limited to, computer-readable storage medium/media, machine-readable storage medium/media, program storage medium/media or computer program product. Such storage media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that the abovementioned non-transitory storage media may take various forms such as cards, tapes, magnetic disks (e.g., floppy disk or hard drive), optical disks (e.g., compact disk read only memory ("CD-ROM") or digital versatile disc ("DVD")) or any other storage medium/media which can be used to store desired information and which can accessed by an IHS, excluding data signals. It should be understood that the given implementations are illustrative only and shall not limit the present disclosure.

What is claimed is:

1. A method of setting a pixel clock frequency for a display of an information handling system (IHS) capable of operating with various wireless cards each having a unique identifier and operational frequency, the method comprising:

detecting by the IHS the unique identifier associated with a wireless card with the IHS;

identifying a geographic region associated with the unique identifier;

selecting a timing descriptor from at least two timing descriptors based on the identified geographic region, wherein each of the at least two timing descriptors comprises a data structure that identifies a different display capability of the display, wherein the at least two timing descriptors are stored in a single extended display identification data (EDID) file within the display, wherein the selected timing descriptor is associated with the identifier, the timing descriptor being further selected to reduce display pixel clock harmonics at the given frequency; and setting the pixel clock frequency based on the timing descriptor selected.

2. The method of claim 1, wherein the step of detecting the unique identifier is performed by a basic input/output system (BIOS) of the IHS and the step of selecting a timing descriptor is performed by a system video basic input/output system (VBIOS).

3. The method of claim 1, wherein the step of selecting a timing descriptor is initiated by a basic input/output system (BIOS).

4. The method of claim 1, wherein the selected timing descriptor is associated with a display setting, the display setting selected from a horizontal scanning frequency, a refresh rate, resolution and a gray level for pixels.

5. The method of claim 1, wherein the wireless card is a wireless wide area network (WWAN) card.

6. The method of claim 1, wherein the identifier is a pixel identification (PID) value associated with a geographic region selected from the United States, Europe and Japan.

7. The method of claim 1, wherein the timing descriptor is stored in a register of the EDID file.

8. The method of claim 7, wherein the EDID file comprises information selected from pixel clock frequency, refresh rate, vendor information, image size, color characteristics, serial number, panel resolution and character strings.

9. An information handling system (IHS) comprising:

a wireless card having a unique identifier and operational frequency coupled to the IHS;

a basic input/output system (BIOS), wherein the BIOS is configured to detect the unique identifier associated with the wireless card;

a video basic input/output system (VBIOS) within a graphics card configured to:

operate a display coupled to the IHS, identify a geographic region associated with the unique identifier;

select a timing descriptor from at least two timing descriptors based on the identified geographic region, wherein each of the at least two timing descriptors comprises a data structure that identifies a different display capability of the display, wherein the at least two timing descriptors are stored in a single extended display identification data (EDID) file within the display, wherein the selected timing descriptor corresponds to the identifier, and wherein a pixel clock frequency is set based on the selected timing descriptor to reduce display pixel clock harmonics at the operational frequency of the wireless card.

10. The system of claim 9, wherein the BIOS instructs the VBIOS to select a timing descriptor.

11. The system of claim 9, wherein the selected timing descriptor is associated with a display setting, the display setting selected from a horizontal scanning frequency, a refresh rate, resolution and a gray level for pixels.

12. The system of claim 9, wherein the wireless card is a wireless wide area network (WWAN) card.

13. The system of claim 9, wherein the identifier is a pixel identification (PID) value associated with a geographic region selected from the United States, Europe and Japan.

14. The system of claim 9, wherein the timing descriptors are stored in a register of the EDID file.

15. The system of claim 14, wherein the EDID file comprises information selected from pixel clock frequency, refresh rate, vendor information, image size, color characteristics, serial number, panel resolution and character strings.

16. A non-transitory computer-readable storage medium having computer executable instructions for carrying out a method, the method comprising:

detecting a unique identifier associated with a wireless card operable for use with an information handling system (IHS) for communications, the wireless card being operational at a given frequency;

identifying a geographic region associated with the unique identifier;

selecting a timing descriptor from at least two timing descriptors based on the identified geographic region, wherein each of the at least two timing descriptors comprises a data structure that identifies a different display capability of the display, wherein the at least two timing descriptors are stored in a single extended display identification data (EDID) file within the display, wherein the selected timing descriptor corresponds to the unique identifier; and setting the pixel clock frequency based on the timing descriptor selected to reduce display pixel clock harmonics at the given frequency.

17. The non-transitory computer-readable storage medium of claim 16, wherein the timing descriptor is associated with a display setting, the display setting selected from a horizontal scanning frequency, a refresh rate, resolution and a gray level for pixels.

18. The non-transitory computer-readable storage medium of claim 16, wherein the wireless card is a wireless wide area network (WWAN) card.

19. The non-transitory computer-readable storage medium of claim 16, wherein the identifier is a pixel identification (PID) value associated with a geographic region selected from the United States, Europe and Japan.

20. The non-transitory computer-readable storage medium of claim 16, wherein the timing descriptor is stored in a register of the EDID file and the EDID file comprises information selected from pixel clock frequency, refresh rate, vendor information, image size, color characteristics, serial number, panel resolution and character strings.

* * * * *